United States Patent [19]

Pickford

[11] 4,329,395
[45] May 11, 1982

[54] HEAT-BONDABLE LAMINATES OF POLYESTER AND METAL FOIL AND CONTAINERS MADE FROM THEM

[75] Inventor: Nigel E. Pickford, Welwyn, England

[73] Assignee: Imperial Chemical Industries Limited, London, England

[21] Appl. No.: 151,894

[22] Filed: May 21, 1980

Related U.S. Application Data

[63] Continuation-in-part of Ser. No. 94,192, Nov. 14, 1979, abandoned.

[30] Foreign Application Priority Data

Jun. 13, 1979 [GB] United Kingdom ............... 7920616

[51] Int. Cl.³ ..................... B32B 15/00; B32B 15/08
[52] U.S. Cl. ........................... 428/344; 428/35; 428/349; 428/354; 428/355; 428/458; 428/461; 428/483
[58] Field of Search ............... 428/351, 458, 461, 523, 428/344, 349, 354, 355, 483

[56] References Cited

U.S. PATENT DOCUMENTS 3,386,645  6/1968  Powell .
4,096,309  6/1978  Stillman ..................... 428/285
4,214,321  7/1980  Nuwayser ..................... 428/458

FOREIGN PATENT DOCUMENTS 21578    1/1981   European Pat. Off. ......... 428/35
56-28855 3/1981   Japan ........................... 428/35
1453621 10/1976   United Kingdom .
1503258  3/1978   United Kingdom .

Primary Examiner—George F. Lesmes
Assistant Examiner—E. Rollins Buffalow
Attorney, Agent, or Firm—Cushman, Darby & Cushman

[57] ABSTRACT

Heat-bondable laminates of polyester (2) bonded to one surface of a metal (aluminium) foil (3) the other surface of which is bonded to a polyolefin heat-bondable layer (4). Laminates of this type are used to make food containers (1) to replace metal cans which are sterilized at 125° C. The heat-bondable layer used hitherto has been high density polyethylene which has a melting point too close to 125° C. and gives only barely adequate tear strength and impact resistance. The laminates of this invention use instead of the polyethylene, a sequential copolymer of propylene with 12 to 30% by weight ethylene and containers made from them achieve better tear strengths and impact resistances and can be sterilized at temperatures as high as 140° C.

4 Claims, 1 Drawing Figure

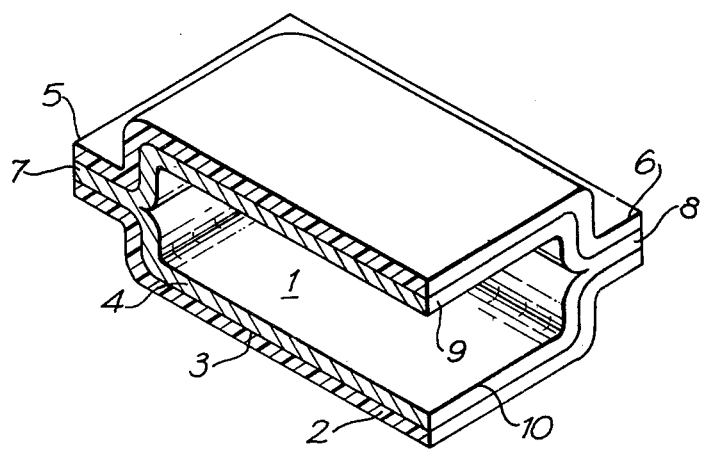

HEAT-BONDABLE LAMINATES OF POLYESTER AND METAL FOIL AND CONTAINERS MADE FROM THEM

This application is a continuation-in-part of Ser. No. 094,192, filed Nov. 14, 1979, now abandoned.

This invention relates to heat-bondable laminates of polyester and metal foil and to containers made from them. Such containers made using aluminium foil have been proposed as alternatives to metal cans.

Usually canned foodstuffs are sterilised at 125° C. in a process which subjects the cans to temporary high pressure and to prolonged heating. Prolonged heating is expensive in energy and impairs the flavour of the food. The alternative polyester/metal foil containers are made from laminates comprising polyester film adhesively bonded to one surface of a metal foil whose other surface is bonded to a polyolefin-based heat-bondable layer. The polyester porvides strength, the metal foil provides a gas barrier and the polyolefin-based heat-bondable layer is used to provide an inexpensive strong bond between peripheral regions of opposed laminates to form the container. Use of such containers consumes little energy. In particular, they can be made in the form of fhat pouches rather than cylinders and because the distance from the surface of a pouch to its centre is shorter than the corresponding distance in a cylinder of the same volume, the pouches heat more quickly to the sterilisation temperature so saving energy and reducing loss of flavour.

Despite the inherent advantages of polyester/metal foil pouches, they have achieved only modest success commercially. Conventional polyolefin-based heat-bondable layers used on metal foils are based on copolymers of ethylene and carboxylic acids, but these have melting points below 125° C. and so cannot be used in heat-sterilisable containers. Instead high density polyethylenes (which have melting points just above 125° C.) have been tried as heat-bondable layers in heat-sterilisable containers but their use requires very careful control of the sterilisation process particularly if the contents become pressurised. In addition, the heat-bonding ability, tear strength and impact resistance of high density polyethylene is barely adequate.

It has now been discovered that certain polypropylene-based heat-bondable layers can be modified to produce containers having greater tear strengths and impact resistance. The containers can also be sterilised at higher temperatures so reducing the period of heating needed and consequently the loss of flavour.

Propylene polymers tolerate sterilisation temperatures as high as 140° C. and so permit more flexible sterilisation processes. However, the use of polypropylene or a copolymer of propylene with less than 8% (by weight of the copolymer) of ethylene produced a container having even poorer impact resistance than those made using high density polyethylene. The impact resistance of the propylene polymers can be increased towards that of high density polyethylene by blending diene-modified ethylene-propylene rubbers with the propylene polymers but the resulting blends are difficult to convert into tough films using a blown tubular film process and so are difficult to apply to the surface of the metal foil.

It has now been discovered that certain propylene-ethylene copolymers of the kind capable of being made in a commercial polypropylene plant can be modified by the inclusion of more ethylene so as to have a heat-bonding ability comparable to that of even low density polyethylene which is considerably better than that of high density polyethylene. Also it has been discovered that the copolymers can be easily converted into thin film using existing commercial plant for making blown tubular polyethylene film and that polyester/metal foil containers made using this new film as the heat-bondable layer have tear strengths and impact resistances greater than similar containers made using high density polyethylene as the heat-bondable layer.

Accordingly, this invention provides a heat-bondable laminate comprising a film of a poly(ethylene terephthalate) composition bonded to one surface of a metal foil whose other surface is bonded to a polyolefin heat-bondable layer characterised in that the heat-bondable layer comprises a copolymer of propylene with from 12 to 30%, preferably 15 to 25% (by weight of the copolymer) of ethylene having a melt flow index of from preferably 0.005 to 10.0 (more preferably 0.01 to 5.0) g/10 minutes wherein at least 65% (preferably at least 75%) by weight of the polymerised propylene in the copolymer is present in sequences of homopolymerised propylene and at least 50% (preferably at least 80%) of the polymerised ethylene in the copolymer is present in sequences of copolymerised ethylene and propylene. Such copolymers are conveniently called "sequential copolymers". The melt flow index of the sequential copolymers is measured according to British Standard 2782: Part 1: Method 105C of 1970 performed at 190° C. but using a 10 kg load instead of a 2.16 kg load.

The sequential copolymers are made by feeding eyhylene into the final stages of an otherwise propylene homopolymerisation process to produce a terminal copolymerisation. Sequences produced towards the end of the copolymerisation become increasingly rich in ethylene and some sequences of homopolymerised ethylene may occur. For this reason it is preferred to feed a mixture of ethylene and propylene. The mixture preferably comprises from 25 to 45% of propylene so that although the latter sequences are preponderantly ethylene sequences, they do contain some propylene and so have a structure similar to low density polyethylene which may explain why the heat-bonding and film-forming properties of the sequential copolymers are more comparable with low density polyethylene than with high density polyethylene or polypropylene.

The sequential copolymer may be applied to the metal foil, for example, by first converting the copolymer into a film preferably 15 to 75μ thick and then bonding the film to the foil by means of heat or adhesive. If an adhesive is used, it must withstand sterilisation temperatures of at least 125° C. and preferably at least 140° C. Suitable adhesives include curable epoxy or polyurethane resins. Alternatively, the copolymer may be melt-coated onto the foil using, for example, techniques such as extrusion coating which are suitable for melt-coating a film of low density polyethylene onto metal foil. Accordingly, this invention also provides a method for making the containers wherein:

(a) the polyolefin heat-bondable material is converted into film 15 to 75μ thick, (b) either before, during or after the metal foil is bonded to the poly(ethylene terephthalate) composition, the film is bonded to the metal foil by means of heat or adhesive to make a laminate comprising a polyolefin heat-bondable layer, a metal foil and a film of poly(ethylene terephthalate) composition, (c) laminates are positioned with their polyolefin heat-bondable layers opposing, and (d) the opposed polyolefin heat-bondable layers are heat-bonded together in peripheral regions of the laminates to form the container.

The polyester is usually adhesively bonded to the metal and suitable adhesives must be able to withstand sterilisation at from 125° to 140° C. A suitable adhesive comprises a poly(ethylene terephthalate) in which from 5 to 30% of the terephthalate moieties have been replaced by isophthalate moieties.

This invention also provides a container made from the laminates of this invention wherein the container comprises opposed laminates heat-bonded together in peripheral regions by means of their polyolefin heat-bondable layers to form the container.

A particular form of such a container will now be described with reference to the drawing which shows a pouch in perspective with part in section.

The FIGURE shows a pouch 1 made from opposed laminates of polyester film 2, aluminium foil 3 and sequential copolymer film 4 heat-bonded together along edges 5 and 6 by fused sequential copolymer layers 7 and 8. Foodstuff may be placed in pouch 1 and then edges 9 and 10 may be heat sealed together by causing fusion of opposed films 4 along edges 9 and 10. Optionally the opposed laminates may be provided by folding double a single piece of laminate.

A pouch as shown in the FIGURE was made using a sequential copolymer of melt flow index 0.04 g/10 minutes and comprising 17% by weight of ethylene and made by injecting a mixture of two parts by weight of ethylene with one part propylene into the final stages of a homopolymerisation of propylene carried out in a hydrocarbon medium. The sequential copolymer could be converted into film using conventional apparatus for making blown tubular polyethylene film and it had a heat-bonding ability similar to that of low density polyethylene. Preliminary tests showed that the pouch would have a superior tear strength and impact resistance as compared with equivalent pouches in which the sequential copolymer was replaced by:

(i) high density polyethylene, (ii) a blend of polypropylene with a hexadiene-modified ethylene-propylene rubber, or (iii) a sequential copolymer of propylene and 8% by weight ethylene.

Stronger laminates can be made using stainless steel foil and cheap laminates can be made using mild steel foil.

I claim:

1. A heat-bondable laminate comprising a film of a poly(ethylene terephthalate) composition directly bonded to one surface of a metal foil whose other surface is bonded to a polyolefin heat-bondable layer in which the heat-bondable layer comprises a copolymer of propylene with from 15 to 30% (by weight of the copolymer) of ethylene wherein at least 65% by weight of the polymerised propylene in the copolymer is present in sequences of homopolymerised propylene and at least 50% of the polymerised ethylene in the copolymer is present in sequences of copolymerised ethylene and propylene.

2. A laminate according to claim 1 wherein the content of ethylene in the copolymer is in the range of from 15 to 25% by weight.

3. A heat-bondable laminate as claimed in claim 1 wherein the film of poly(ethylene terephthalate) is bonded to the metal foil by means of an adhesive comprising isophthalate moieties.

4. A heat-bondable laminate as claimed in claim 1 of claim 3 wherein at least 75% by weight of the polymerised propylene in the copolymer is present in sequences of homopolymerised propylene and at least 80% of the polymerised ethylene in the copolymer is present in sequences of copolymerised ethylene and propylene.

* * * * *